United States Patent
Hamano

(10) Patent No.: US 7,365,151 B2
(45) Date of Patent: Apr. 29, 2008

(54) SOLVENT FOR TREATING POLYSTYRENE RESIN AND METHOD OF TREATING POLYSTYRENE RESIN WITH THE SAME

(76) Inventor: Shigenobu Hamano, 1-11, Sukematsu-cho 1-chome, Izumiotsu-shi, Osaka 595-0071 (JP)

(*) Notice: Subject to any disclaimer, the term of this patent is extended or adjusted under 35 U.S.C. 154(b) by 245 days.

(21) Appl. No.: 10/513,206

(22) PCT Filed: Nov. 29, 2002

(86) PCT No.: PCT/JP02/12474

§ 371 (c)(1),
(2), (4) Date: Nov. 2, 2004

(87) PCT Pub. No.: WO03/095541

PCT Pub. Date: Nov. 20, 2003

(65) Prior Publication Data

US 2005/0215651 A1    Sep. 29, 2005

(30) Foreign Application Priority Data

May 14, 2002 (JP) ............................. 2002-138966

(51) Int. Cl.
*C08F 6/00* (2006.01)
(52) U.S. Cl. .................... 528/480; 525/64; 525/89; 525/98; 525/194; 525/333.3; 525/333.4
(58) Field of Classification Search ............... 521/47; 525/64, 89, 98, 194, 333.3, 333.4; 528/480
See application file for complete search history.

(56) References Cited

U.S. PATENT DOCUMENTS

| 2002/0060535 A1* | 5/2002 | Yang et al. ............ 315/368.26 |
|---|---|---|
| 2002/0060725 A1* | 5/2002 | Shinada et al. ............... 347/86 |
| 2002/0069233 A1* | 6/2002 | Muller et al. ............... 709/102 |

FOREIGN PATENT DOCUMENTS

| EP | 0 739 930 A2 | 10/1996 |
|---|---|---|
| EP | 0 789 052 A1 | 8/1997 |
| JP | 02-001748 A | 1/1990 |
| JP | 03-000214 | 1/1991 |
| JP | 04-219186 | 8/1992 |
| JP | 05-59212 A | 3/1993 |
| JP | 05-092428 | 4/1993 |
| JP | 05-092429 | 4/1993 |
| JP | 06-238688 | 8/1994 |
| JP | 07-113089 | 5/1995 |
| JP | 09-040802 A | 2/1997 |
| JP | 09-503235 | 3/1997 |
| JP | 09-157435 A | 6/1997 |
| JP | 11-080418 | 3/1999 |
| JP | 2000-248109 A | 9/2000 |
| JP | 2002-060535 A | 2/2002 |
| JP | 2002-060725 A | 2/2002 |
| JP | 2002-069233 A | 3/2002 |
| JP | 2002-128946 A | 5/2002 |
| WO | WO 95/09196 A1 | 4/1995 |

* cited by examiner

*Primary Examiner*—Terressa Boykin
(74) *Attorney, Agent, or Firm*—Knobbe Martens Olson & Bear LLP

(57) ABSTRACT

A solvent for polystyrene resin treatment is used for reducing the volume of a polystyrene resin by contacting it with the solvent; and a method of treating polystyrene resins. The solvent is characterized by comprising 20 to 70 wt. % of diethylene glycol dimethyl ether and 30 to 80 wt. % of $C_{9-13}$ aliphatic hydrocarbon. The method employs the solvent.

12 Claims, No Drawings

SOLVENT FOR TREATING POLYSTYRENE RESIN AND METHOD OF TREATING POLYSTYRENE RESIN WITH THE SAME

This application is the U.S. National Phase under 35 U.S.C. §317 of International Application PCT/JP02/12474, filed Nov. 29, 2002, which claims priority to Japanese Patent Application No. 2002-128966, filed May 14, 2002. The International Application was not published under PCT Article 21(2) in English

TECHNICAL FIELD

The present invention relates to a solvent for reducing the volume of a polystyrene resin by contacting the solvent with the polystyrene resin, and a method of treating a polystyrene resin using the solvent.

BACKGROUND ART

Polystyrene foam is bulky due to its foamy and lightweight, and moreover polystyrene foam has a strong structure and hence internal gas cannot be compressed or discharged even by the application of considerable external pressure. The efficiency of transporting recovered waste polystyrene foam is thus poor, and transportation costs and treatment costs are very high.

Methods for reducing the volume of waste polystyrene foam has been proposed, wherein waste polystyrene foam is made to contact a liquid medium in which polystyrene foam is soluble, thus dissolving the waste polystyrene foam and reducing the volume thereof (Japanese Unexamined Patent Publication No. 1990-1748, Japanese Unexamined Patent Publication No. 1993-59212, Japanese Unexamined Patent Publication No. 1995-113089, etc.). Furthermore, a solvent that is relatively safe during use, can be easily handled, has no toxic irritating or unpleasant odor, is safe, does not require use of gas or deodorant masks or local ventilation, helps to improve the working environment and promote safety, and thus cause no problems for the working environment, causes no nervous or liver disorders, and is not teratogenic or carcinogenic has been developed (Japanese Unexamined Patent Publication No. 2002-60535).

However, polystyrene resin treated with the solvent disclosed in Japanese Unexamined Patent Publication No. 2002-60535 and other solvents of prior arts exhibit excessively strong adhesion, causing it to adhere to the treatment vessel and become ropy when removed therefrom, which complicates the removal of the polystyrene resin from the vessel.

When polystyrene resin is immersed in a solvent to reduce its volume, the polystyrene resin generally absorbs the solvent and forms a gel. The gel then sediments, forming a two-layered structure (with the solvent in the upper layer and the gel in the lower layer) inside the treatment vessel. If the polystyrene resin absorbs a large amount of solvent when it forms a gel, the amount of the solvent remaining in the dipping vessel decreases and the addition of further solvent may be necessary to reduce the volume of additional polystyrene resin. Therefore, it is economically advantageous to have a smaller amount of solvent absorbed by the polystyrene resin when it forms a gel.

Furthermore, if the polystyrene resin absorbs a large amount of solvent, the resulting gel becomes sticky and adheres to the dipping vessel, and the removal of the gel from the dipping vessel becomes complicated. Therefore, it is desirable for the treated polystyrene resin (gel) to exhibit only a small degree of adhesion to the dipping vessel.

Because polystyrene resin has a density less than that of solvents, polystyrene resin floats when placed in a solvent; however, the greater the area over which the polystyrene resin contacts the solvent, the greater the volume of the polystyrene resin is reduced. Therefore, after placing the polystyrene resin in the solvent, the floating polystyrene resin is press fit by pushing it with a presser board, etc., to maximize the area over which the polystyrene resin contacts the solvent. However, if the polystyrene resin whose volume is to be reduced is rigid, a large force is needed for press fitting, and therefore it is advantageous if the polystyrene resin whose volume is to be reduced is soft to some degree. Therefore, it is desirable that the solvent be able to form the polystyrene resin into a gel. However, caution is required if the polystyrene resin is excessively softened by the solvent because, as described above, the adhesion of the polystyrene resin to the vessel generally increases.

In other words, if the treated polystyrene resin is insufficiently hard, the adhesion thereof to the vessel or presser board is too great and this lowers operating efficiency, and if the treated polystyrene resin is too hard, the pressure required for press fitting increases. Therefore, it is desirable that a solvent that gives the treated polystyrene resin a preferable hardness be provided. Furthermore, because many types of polystyrene resin will float in solvents, simply placing the polystyrene resin in a solvent is disadvantageous with regard to the treatment time since the contact area between the polystyrene resin and the solvent will be small. Therefore, it is more effective to apply pressure to the polystyrene resin floating in the solvent (e.g., by placing a heavy substance on the polystyrene resin) to dip the polystyrene resin into the solvent. In this case, if the adhesion of the treated polystyrene resin is too strong, in many cases, the polystyrene resin will adhere to the object that is used to apply pressure to the polystyrene resin, complicating the operation. Therefore, development of a solvent that reduces the adhesion of polystyrene resin that is treated therewith has been awaited.

When the volume of polystyrene resin is reduced in supermarkets, etc., which collect polystyrene foam items such as food trays, etc., equipment or the like for strictly controlling temperature should be made as unnecessary as possible. Therefore, development of a solvent that can reduce the volume of polystyrene foam even when the ambient air temperature is 0° C. or less in winter has been awaited.

The present invention provides a solvent for treating polystyrene resin so that the adhesion of the treated polystyrene resin is lower than that treated by heretofore-used solvents, with the amount of absorbed solvent being small and able to reduce the volume of polystyrene resin even at low temperatures, and a method for treating polystyrene resin using the solvent.

DISCLOSURE OF THE INVENTION

The present inventor conducted intensive research to overcome drawbacks of the prior art techniques. He found that, by using a solvent containing a specific glycol ether and a specific aliphatic hydrocarbon, the adhesion of treated polystyrene resin is reduced and the amount of solvent absorbed by the treated polystyrene resin is small. The present invention has been accomplished based on the above findings. The solvent of the present invention exhibits excellent volume reduction effects even at low temperatures. The solvent of the present invention is excellent in that a large amount of polystyrene foam can be treated per unit amount of solvent.

In other words, the present invention relates to a solvent for treating polystyrene resin and a method for treating polystyrene resin as described below.

1. A solvent for polystyrene resin treatment comprising 20 to 70 wt. % of diethylene glycol dimethyl ether and 30 to 80 wt. % of $C_{9-13}$ aliphatic hydrocarbon.

2. A solvent for polystyrene resin treatment according to Item 1, wherein the content of diethylene glycol dimethyl ether is 40 to 70 wt. % and the content of $C_{9-13}$ aliphatic hydrocarbon is 30 to 60 wt. %.

3. A solvent for polystyrene resin treatment according to Item 1, wherein the content of diethylene glycol dimethyl ether is 50 to 60 wt. % and the content of $C_{9-13}$ aliphatic hydrocarbon is 40 to 50 wt. %.

4. A solvent for polystyrene resin treatment according to Item 1, wherein the content of diethylene glycol dimethyl ether is 51 to 59 wt. % and the content of $C_{9-13}$ aliphatic hydrocarbon is 41 to 49 wt. %.

5. A solvent for polystyrene resin treatment according to Item 1, wherein the content of diethylene glycol dimethyl ether is 52 to 57 wt. % and the content of $C_{9-13}$ aliphatic hydrocarbon is 43 to 48 wt. %.

6. A method for reducing the volume of polystyrene resin using the solvent for polystyrene resin treatment of any one of Items 1 to 5.

The solvent for treating polystyrene resin of the present invention is used for reducing the volume of polystyrene resin, which is characterized in that the solvent contains 40 to 70 wt. % of diethylene glycol dimethyl ether and 30 to 60 wt. % of aliphatic hydrocarbon(s) having 9 to 13 carbon atoms. Polystyrene foam-treatment solvents containing glycol ethers and paraffins are known; however, in the present invention, by using diethylene glycol dimethyl ether and $C_{9-13}$ aliphatic hydrocarbon, volume reduction of polystyrene resin at a low temperature becomes possible, and the adhesion of the polystyrene resin having undergone volume reduction treatment is lowered, increasing the amount of polystyrene resin treated per unit amount of solvent.

The method for treating polystyrene resin of the present invention is characterized in that volume reduction of polystyrene resin is conducted by using the solvent for treating polystyrene resin of the present invention. For example, to reduce the volume of a polystyrene resin, the polystyrene resin is made into a jelly or gel state by treating the polystyrene resin in such a manner that the solvent for treating polystyrene resin of the present invention is made to contact the polystyrene resin. There are no particular limitations on the method of making the solvent of the present invention contact the polystyrene resin, and methods commonly used in the field of treating polystyrene resins with solvents, such as immersion, spraying, etc., can be employed.

There are no particular limitations on the conditions for treating polystyrene resins using the solvent of the present invention as long as the volume of the polystyrene resin is reduced, and the conditions can be suitably selected in accordance with the amount and form of the polystyrene resin to be treated, the proportions of the constituent components of the solvent for treating polystyrene resin of the present invention, etc. For example, polystyrene foam may be treated by being made to contact the solvent in such a manner that the polystyrene foam is placed in the solvent for polystyrene resin treatment of the present invention having a temperature of −30 to 60° C. and preferably −15 to 40° C., and pressure is then applied to the floating polystyrene foam so as to immerse it in the solvent.

There are no particular limitations on the polystyrene resins treatable in the present invention, but styrofoam (polystyrene foam) is preferable. Polystyrene resin is used in very wide range of fields, and it is not possible to mention all of these, but for example polystyrene resin is used in trays (containers) for food or the like, thermal insulating materials, stationery, containers for recording media (cassette tapes, CDs, MDs, MOs, DVDs, etc.), the resin parts of various electric appliances, etc., and these are included in the targets to be treated in the present invention.

The solvent for treating polystyrene resin of the present invention contains diethylene glycol dimethyl ether. Diglyme manufactured by Maruzen Petrochemical Co., Ltd. is a preferable example of commercially available diethylene glycol dimethyl ether.

The content of diethylene glycol dimethyl ether in the solvent for treating polystyrene resin of the present invention is 20 to 70 wt. %, preferably 40 to 70 wt. %, more preferably 50 to 60 wt. %, further preferably 51 to 59 wt. %, and most preferably 52 to 57 wt. %. If the content of diethylene glycol dimethyl ether is within the above ranges, the solvent exhibits excellent adhesion, reduction ability at low temperatures and treatment amount.

Furthermore, the solvent for treating polystyrene resin of the present invention contains an aliphatic hydrocarbon having 9 to 13 carbon atoms. Not only a single kind of aliphatic hydrocarbon having 9 to 13 carbon atoms may be used but also mixtures of two or more such kinds of aliphatic hydrocarbons. The aliphatic hydrocarbon(s) having 9 to 13 carbon atoms may be straight chain or branched.

Examples of $C_{9-13}$ aliphatic hydrocarbons include nonanes, decanes, undecanes, dodecanes, tridecanes, and mixtures thereof. Examples of preferable such aliphatic hydrocarbons are nonanes; tridecanes; n-paraffin SL (a mixture of $C_{10}$ paraffin, $C_{11}$ paraffin and $C_{12}$ paraffin), n-paraffin L (a mixture of $C_{10}$ paraffin, $C_{11}$ paraffin, $C_{12}$ paraffin and $C_{13}$ paraffin) and n-paraffin M (a mixture of $C_{12}$ paraffin, $C_{13}$ paraffin and $C_{14}$ paraffin) made by Nippon Petrochemicals Co., Ltd.; Isosol 300 and Isosol 400, which are isoparaffins made by Nippon Petrochemicals Co., Ltd., and so on. Nonanes, tridecanes, n-paraffin SL, n-paraffin L and n-paraffin M are preferable; nonanes and tridecanes are more preferable; and n-nonanes and n-tridecanes are the most preferable. Examples of preferable commercially available n-tridecanes include n-paraffin N-13 manufactured by Japan Energy Corporation, etc.

The content of $C_{9-13}$ aliphatic hydrocarbon in the solvent for treating polystyrene resin of the present invention is 30 to 80 wt. %, preferably 30 to 60 wt. %, more preferably 40 to 50 wt. %, further more preferably 41 to 59 wt. %, and the most preferably 43 to 48 wt. %. If the content of $C_{9-13}$ aliphatic hydrocarbon is within the above ranges, the solvent exhibits excellent adhesion, reduction ability at low temperatures and treatment amount.

In the solvent for treating polystyrene resin of the present invention, it is possible to add aliphatic hydrocarbons other than those having 9 to 13 carbon atoms as long as it does not adversely affect the effect of the invention, and, in this case, it is preferable that the content of such other aliphatic hydrocarbon(s) in the solvent for treating polystyrene resin be not more than 5 wt. %.

Note that, in the present invention, "reduce the volume of polystyrene resin" means to reduce the volume of the polystyrene resin or reduce the bulk of the polystyrene resin.

There are no particular limitations on the treatment conditions when polystyrene resin is treated using the solvent for polystyrene resin treatment of the present invention as long as the volume of the polystyrene resin is reduced, and these conditions can be suitably selected in accordance with the amount and form of the polystyrene resin to be treated, the proportions of the constituent components of the solvent for polystyrene resin treatment of the present invention, etc. For example, the treatment can be carried out by placing polystyrene foam into the solvent for polystyrene resin treatment of the present invention having a temperature of −30 to 60° C. and preferably −15 to 40° C., and then making the solvent for polystyrene resin treatment contact the polystyrene foam by, for example, applying pressure to the polystyrene foam at a portion which is above the surface of the solvent so as to immerse the polystyrene foam in the solvent. The treatment time is approximately 20 to 80 seconds at normal temperatures when an excess of solvent is used for a polystyrene foam sample having a size of 5 cm×5 cm×5 cm (2.5 g). In cases when the treatment is conducted at lower temperatures, the treatment time will be longer.

The solvent for treating polystyrene resin of the present invention is odorless or has a slight odor, and by itself exhibits a satisfactory ability for treating polystyrene resin and dissolution speed; however, depending on the mode of application, for safety reasons, having some odor may be preferable to being odorless. Therefore, to cope with such applications or requirements, it is possible to provide some odor to the solvent for treating polystyrene resin of the present invention by adding one or more quality-improving agents thereto.

Because it is preferable that such quality-improving agents do not adversely affect human body and the environment, perfumes generally used in toilets, houses, offices, cars, etc.; food additives; medicines; cosmetics, etc., are preferably used, among which those having compatibility with polystyrene resins, especially polystyrene foam, are particularly preferable.

Specific examples of quality-improving agents include ethylene glycol butyl methyl ether, ethylene glycol dimethyl ether, ethylene glycol ethyl methyl ether, ethylene glycol propyl methyl ether, ethylene glycol diethyl ether, ethylene glycol ethyl propyl ether, ethylene glycol butyl ethyl ether, ethylene glycol dipropyl ether, ethylene glycol butyl propyl ether, ethylene glycol dibutyl ether and like ethylene glycol dialkyl ethers having terminal $C_1$-$C_4$ alkyl groups; pinene, fenchene, camphene, myrcene, pinane, menthane, cineole, limonene, cymene and like terpenes; fenchone, linalool, fenchol, citronellal, camphor, terpineol, menthone, neo menthol, borneol, isoborneol, menthol, citronellol, nerol, geraniol, carvone, hydroxy citronellal, terpin, ionone and like terpenoids; alkyl esters of fatty acids obtained by etherifying acetic acid, propionic acid, butyric acid, valeric acid, caproic acid, enanthic acid, caprylic acid, pelargonic acid, capric acid, undecylic acid, lauric acid, tridecyl acid and like fatty acids; esters of fatty acids obtained by etherifying fatty acids extracted from coconut oil, castor oil and like vegetable oils; and heptanone, octanone, nonanone, decanone and like higher ketones. In the present invention, at least one quality-improving agent selected from the above is preferably used.

The amount of quality-improving agent(s) added is suitably selected depending on the types, combinations, working conditions and/or modes thereof and cannot be generalized; however, usually, the amount added is preferably about 0.1 to 10 wt. % and more preferably about 0.5 to 10 wt. % relative to the solvent for treating polystyrene resin.

In addition to the above components, various additives may be added to the solvent for treating polystyrene resin of the present invention as long as the objects of the present invention can be attained. Additives heretofore used in solvents for treating polystyrene resin may be used in the present invention.

BEST MODE FOR CARRYING OUT THE INVENTION

The present invention is explained below in detail with reference to Examples; however, the present invention is not limited to these examples. In the Examples, the reagents below were used. Diethylene glycol dimethyl ether: Diglyme, product of Maruzen Petrochemical Co., Ltd. n-nonanes: product of Nippon Petrochemical Co., Ltd. n-tridecanes: n-paraffin N-13, product of Japan Energy Corporation n-paraffin L: product of Nippon Petrochemical Co., Ltd. n-paraffin SL: product of Nippon Petrochemical Co., Ltd.

EXAMPLE 1

60 parts by weight of n-tridecane was homogeneously mixed with 40 parts by weight of diethylene glycol dimethyl ether, giving a colorless and slightly odorous solvent for treating polystyrene resin of the present invention.

COMPARATIVE EXAMPLE 1

A solvent was obtained in the same manner as Example 1 except xylene was used instead of diethylene glycol dimethyl ether.

TEST EXAMPLE 1

The solvents obtained in Example 1 and Comparative Example 1 were compared in their volume-reduction abilities. 5 cm×5 cm×5 cm cubes of polystyrene foam (2.5 g) having a foaming magnification of 60× were placed without applying pressure in the solvents obtained in Example 1 and Comparative Example 1 having a liquid temperature of 24° C. or −15° C., and the time needed to reduce the volume was measured. Table 1 shows the results. Adhesion of the treated polystyrene foam was also evaluated.

TABLE 1

|  | 24° C. | −15° C. |
| --- | --- | --- |
| Example 1 | 39 seconds | 3 minutes 55 seconds |
| Comparative Example 1 | 19 minutes 50 seconds | Could not reduce (30 minutes or more) |

When the polystyrene having undergone volume-reduction treatment was lifted with the thumb and index finger, the polystyrene foam treated in the solvent of Example 1 adhered to the fingers but easily came off when the fingers were shaken lightly. The polystyrene foam treated in the solvent of Comparative Example 1 adhered to the fingers and hardly came off even if the fingers were shaken, and even when it did come off the fingers, it became ropy and a large amount remained attached to the fingers.

EXAMPLE 2

Using 55 parts by weight of n-tridecane and 45 parts by weight of diethylene glycol dimethyl ether, a solvent for treating polystyrene resin was obtained in the same manner as Example 1.

COMPARATIVE EXAMPLE 2

Using 55 parts by weight of n-paraffin L and 45 parts by weight of diethylene glycol diethyl ether, a solvent for treating polystyrene resin was obtained in the same manner as Example 1.

TEST EXAMPLE 2

The solvents obtained in Example 2 and Comparative Example 2 were compared in their volume-reduction abilities in the same manner as in Test Example 1. The volume reduction time of the solvent of Example 2 was shorter than that of the solvent of Comparative Example 2 at 24° C. and at −15° C. The adhesion of the polystyrene foam that had been treated in the solvent of Example 2 to the fingers was less than that had been treated in the solvent of Comparative Example 2.

EXAMPLE 3

Using 50.5 parts by weight of n-tridecane and 49.5 parts by weight of diethylene glycol dimethyl ether, a solvent for treating polystyrene resin was obtained in the same manner as in Example 1.

COMPARATIVE EXAMPLE 3

Using 50 parts by weight of n-paraffin L and 50 parts by weight of diethylene glycol diethyl ether, a solvent for treating polystyrene resin was obtained in the same manner as in Example 1.

TEST EXAMPLE 3

The solvents obtained in Example 3 and Comparative Example 3 were compared in their volume-reduction abilities in the same manner as in Test Example 1. The volume reduction time of the solvent of Example 3 was shorter than that of the solvent of Comparative Example 3 at 24° C. and −15° C. The adhesion of the polystyrene foam treated in the solvent of Example 3 to the fingers was less than that treated in the solvent of Comparative Example 3.

EXAMPLE 4

Using 45 parts by weight of n-tridecane and 55 parts by weight of diethylene glycol dimethyl ether, a solvent for treating polystyrene resin was obtained in the same manner as in Example 1.

COMPARATIVE EXAMPLE 4

Using 45 parts by weight of n-paraffin L and 55 parts by weight of diethylene glycol dimethyl ether, a solvent for treating polystyrene resin was obtained in the same manner as in Example 1.

TEST EXAMPLE 4

The solvents obtained in Example 4 and Comparative Example 4 were compared in their volume-reduction abilities in the same manner as in Test Example 1. The volume reduction time of the solvent of Example 4 was shorter than that of the solvent of Comparative Example 4 at 24° C. and at −15° C. The adhesion of the polystyrene foam treated in the solvent of Example 4 to the fingers was less than that treated in the solvent of Comparative Example 4.

EXAMPLE 5

By mixing diethylene glycol dimethyl ether and an aliphatic hydrocarbon having 9 to 13 carbon atoms in the ratios shown in Table 2, solvents for treating polystyrene resin were prepared.

TABLE 2

|  | Diglyme | n-nonane | n-tridecane | n-paraffin L |
|---|---|---|---|---|
| Solvent 1 | 59 | 41 | | |
| Solvent 2 | 59 | | 41 | |
| Solvent 3 | 57 | 43 | | |
| Solvent 4 | 57 | | 43 | |
| Solvent 5 | 52 | 48 | | |
| Solvent 6 | 52 | | 48 | |
| Solvent 7 | 55 | | | 45 |
| Solvent 8 | 55 | 45 | | |
| Solvent 9 | 55 | | 45 | |

Unit: wt. %

TEST EXAMPLE 5

Solvents 1 to 9 prepared in Example 5 were subjected to the following tests.

A. Volume reduction speed at low temperature 200 g of each solvent was placed in glass vessels, a 5 cm×5 cm×5 cm cube of polystyrene foam (2.5 g) having a foaming magnification of 60×was placed therein, and the time needed to reduce the volume was measured. Pressure was not applied to the polystyrene foam placed (i.e., not press-fitted). The surrounding air temperature was 19° C. and the solvent temperature was −1° C. Table 3 shows the results. Each solvent exhibited excellent reduction time and sedimentation.

TABLE 3

A. Volume reduction speed at low temperature

| | Volume reduction time (seconds) |
|---|---|
| Solvent 1 | 41 |
| Solvent 2 | 55 |
| Solvent 3 | 42 |
| Solvent 4 | 65 |
| Solvent 5 | 49 |
| Solvent 6 | 65 |
| Solvent 7 | 66 |
| Solvent 8 | 39 |
| Solvent 9 | 69 |

B. Volume reduction speed, sedimentation, solvent absorption and adhesion at ordinary temperature 200 g of each solvent was placed in glass vessels, 20 cubes of the polystyrene foam used in A (2.5 g each, total weight of polystyrene foam: 50 g) were placed in the solvent in sequence, and tests regarding the following items were conducted.

Volume reduction speed: the time needed to reduce the volume of the polystyrene foam was measured.

Sedimentation: the conditions where the volume-reduced polystyrene foam precipitated in solvents were observed.

A: the volume-reduced polystyrene foam quickly precipitated.

B: the volume-reduced polystyrene foam precipitated.

C: the volume-reduced polystyrene foam went up and down in the solvent.

D: the volume-reduced polystyrene foam floated.

Solvent absorption: the volume-reduced polystyrene foam absorbed the solvent and precipitated, and as observed by the human eye, the solvent existed in an upper layer and the volume-reduced polystyrene foam precipitated in a lower layer. The amount of the solvent in the upper layer was evaluated as the amount of the solvent not absorbed by the polystyrene foam, so that when the amount of the solvent remained in the upper layer was large, it was determined that the amount of solvent absorbed was small and when the solvent remained in the upper layer was small, it was determined that the amount of solvent absorbed was large.

A: The amount of solvent absorbed was very small.

B: The amount of solvent absorbed was small.

C: The amount of solvent absorbed was relatively large.

D: All the solvent was absorbed.

Adhesion: Adhesion of the volume-reduced polystyrene foam to the glass vessel was observed.

A: The volume-reduced polystyrene foam hardly adhered to the vessel and separated from the vessel when the vessel was inclined at 75°.

B: The volume-reduced polystyrene foam slightly adhered to the vessel but separated when the vessel was turned upside down.

C: The volume-reduced polystyrene foam adhered to the vessel and did not separate even when the vessel was turned upside down.

D: The volume-reduced polystyrene foam was sticky, firmly adhered to the vessel and did not separate even when the vessel was turned upside down.

Pressure was applied to the polystyrene foam placed in the solvent in such a manner that the polystyrene foam was pushed into the solvent so that the area of the polystyrene foam which did not contact the solvent was made as small as possible. The surrounding air temperature was 19° C. and the solvent temperature was 17.5° C.

Table 4 shows the results. For solvent 1, a relatively large amount of the solvent was absorbed by the volume-reduced polystyrene foam, and the amount of solvent necessary to evaluate sedimentation did not remain in the vessel, and therefore an evaluation of sedimentation was not conducted.

TABLE 4

| | Volume reduction time (seconds) | Sedimentation | Solvent absorbency | Adhesion |
|---|---|---|---|---|
| Solvent 1 | 359 | — | C | B |
| Solvent 2 | 139 | B | B | B |
| Solvent 3 | 122 | B | B | B |
| Solvent 4 | 109 | B | A | A |
| Solvent 5 | 84 | B | A | B |
| Solvent 6 | 133 | B | A | A |
| Solvent 7 | 104 | A | A | A |
| Solvent 8 | 79 | A | A | A |
| Solvent 9 | 112 | A | A | A |

All solvents exhibited excellent volume-reduction times. Solvents 2 to 9 had good sedimentation and were suitable for press-fitting. Because not much of solvents 2 to 9 were absorbed, the amounts of the solvents remaining in the vessel were large, and therefore they were able to treat additional polystyrene foam. All the solvents exhibited small adhesion to the vessel, and therefore the volume-reduced polystyrene foam was easily removed.

C. The volume-reduction amount at ordinary temperature 200 g of solvent 7 was placed in a glass vessel, and 80 cubes of the polystyrene foam used in A (2.5 g each, total weight of polystyrene foam: 200 g) were placed in the solvent.

Pressure was applied to the polystyrene foam placed in the solvent in such a manner that the polystyrene foam was pushed into the solvent so that the area of the polystyrene foam which did not contact the solvent was made as small as possible. The surrounding air temperature was 19° C. and the solvent temperature was 17.5° C.

As a result, solvent 7 reduced the volume of all 80 cubes of polystyrene foam, and therefore the solvent has the ability to reduce the volume of not less than 1 kg of polystyrene foam per 1 L.

INDUSTRIAL APPLICABILITY

A solvent for treating polystyrene resin of the present invention can satisfactory reduce the volume of polystyrene resin even at low temperatures (for example, when the temperature is 0° C. or less in winter). Because the volume-reduced polystyrene resin is precipitated, it is suitable for press-fitting the polystyrene resin. Furthermore, because the amount of the solvent absorbed by the volume-reduced polystyrene resin is small, the amount of the solvent remaining in the vessel is large. As a result, volume reduction of a larger amount of polystyrene resin is possible. Furthermore, because the adhesion of the volume-reduced polystyrene resin is low, the amount of the polystyrene resin adhering to the vessel, etc., is small, and the volume-reduced polystyrene resin can be easily removed from the vessel after the treatment.

The invention claimed is:

1. A solvent for polystyrene resin treatment comprising 51 to 59% wt. % of diethylene glycol dimethyl ether and 41-49% wt. % of $C_{9-13}$ aliphatic hydrocarbon.

2. A solvent for polystyrene resin treatment according to claim 1, wherein the content of diethylene glycol dimethyl ether is 52 to 57 wt. % and the content of $C_{9-13}$ aliphatic hydrocarbon is 43 to 48 wt. %.

3. A method for reducing the volume of polystyrene resin using the solvent for polystyrene resin treatment of claim 1.

4. A method for reducing the volume of polystyrene resin using the solvent for polystyrene resin treatment of claim 2.

5. A method for reducing the volume of polystyrene resin comprising placing the polystyrene resin in a solvent of claim 1.

6. The method according to claim 5, wherein the polystyrene resin is placed in the solvent at a temperature of −30° C. to 60° C.

7. The method according to claim 6, wherein the polystyrene resin is immersed in the solvent with force.

8. The method according to claim 5, wherein the polystyrene resin is polystyrene form.

9. A solvent in contact with a polystyrene resin article, comprising 51 to 59 wt. % of diethylene glycol dimethyl ether and 41 to 49 wt. % of $C_{9-13}$ aliphatic hydrocarbon.

10. The solvent according to claim 9, wherein the polystyrene article is immersed.

11. The solvent according to claim 9, wherein the polystyrene resin is polystyrene foam.

12. The solvent according to claim 9, wherein the $C_{9-13}$ aliphatic hydrocarbon is selected from the group consisting of nonanes, decanes, undecanes, dodecanes, tridecanes, and mixtures thereof.

* * * * *

UNITED STATES PATENT AND TRADEMARK OFFICE
CERTIFICATE OF CORRECTION

PATENT NO. : 7,365,151 B2 Page 1 of 1
APPLICATION NO. : 10/513206
DATED : April 29, 2008
INVENTOR(S) : Shigenobu Hamano It is certified that error appears in the above-identified patent and that said Letters Patent is hereby corrected as shown below:

At the Title Page, column 2 Item [57] (Abstract), line 1, After "treatment" insert -- which --.

At column 1, line 8, Delete "128966," and insert -- 138966, --, therefor.

At column 1, line 10, After "English" insert -- . --.

At column 6, line 38, Delete "60×were" and insert -- 60× were --, therefor.

At column 8, line 32, Delete "60×was" and insert -- 60× was --, therefor.

At column 8, line 56-60, After "temperature" delete "200 g of each solvent was placed in glass vessels, 20 cubes of the polystyrene foam used in A (2.5 g each, total weight of polystyrene foam: 50 g) were placed in the solvent in sequence, and tests regarding the following items were conducted." and insert the same on Col. 8, Line 57, as a separate paragraph.

At column 10, line 55, In Claim 8, delete "form." and insert -- foam. --, therefor.

Signed and Sealed this

Second Day of June, 2009

JOHN DOLL
*Acting Director of the United States Patent and Trademark Office*